April 14, 1931.     H. H. HARRIS     1,800,686
SPOTLIGHT MOUNTING
Filed March 23, 1929
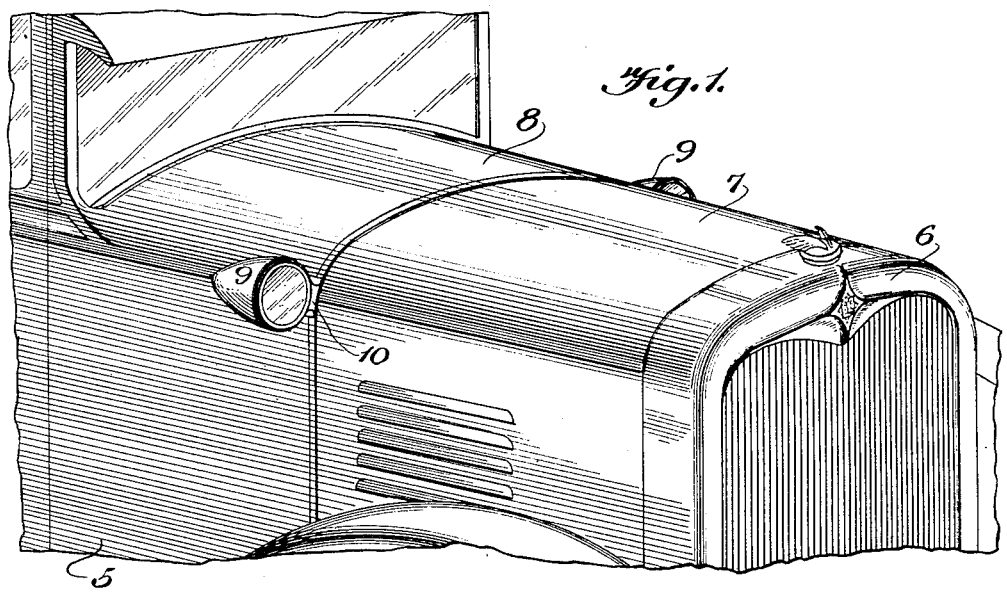
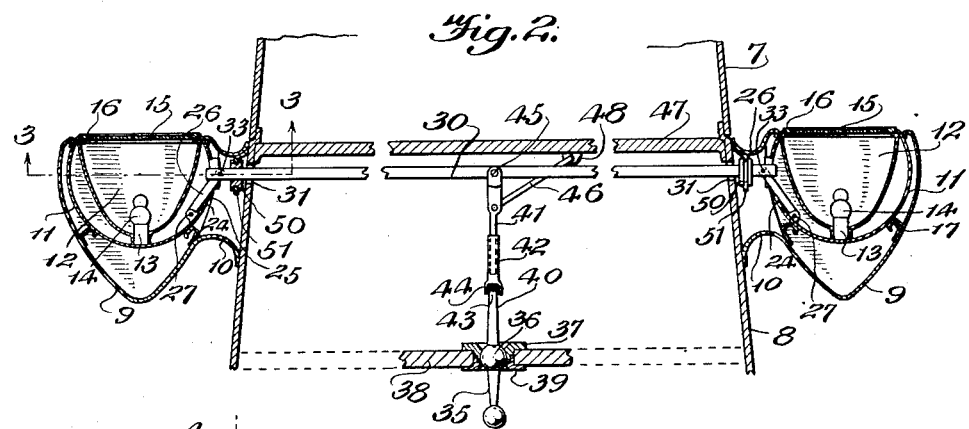
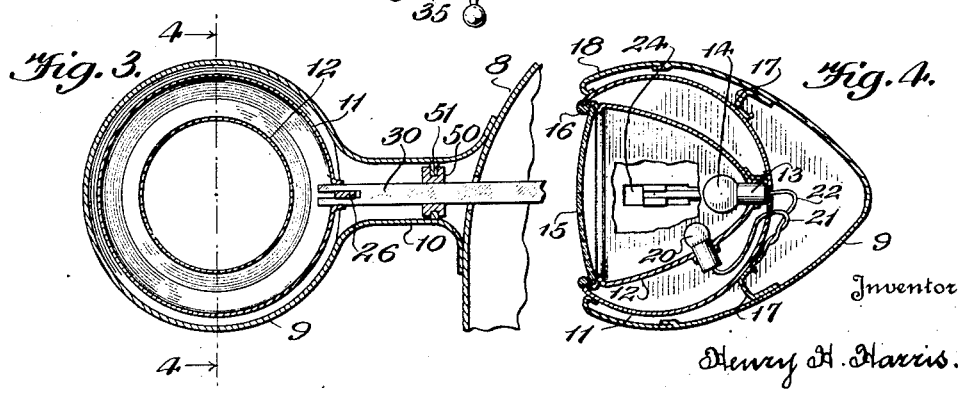
Inventor
Henry H. Harris.
By Stanley Lightfoot
Attorney Patented Apr. 14, 1931

1,800,686

UNITED STATES PATENT OFFICE

HENRY H. HARRIS, OF DETROIT, MICHIGAN, ASSIGNOR TO NOBLE & HARRIS, OF DETROIT, MICHIGAN, A COPARTNERSHIP COMPOSED OF WARREN NOBLE AND HENRY H. HARRIS

SPOTLIGHT MOUNTING

Application filed March 23, 1929. Serial No. 349,440.

This invention relates to improvements in auxiliary lights for use particularly on automobiles.

The primary object of this invention is to provide a set of lights, of the above mentioned character which may be controlled from a point on the instrument board for adjusting the lights horizontally as well as vertically, or both.

A further object of this invention is to provide a device of the above mentioned character adapted to conform to the symmetry of the car's design.

A still further object of this invention is to provide a set of auxiliary lights positioned on the side of the cowl particularly adapted for automobiles of the closed type, wherein the corner posts adjacent the windshield are too light in construction to permit the conventional form of spotlight being used.

A still further object of this invention is to provide a set of auxiliary lights which will not interfere with the driver's vision, will not increase the wind resistance and which may serve as combination driving lights, side lights and parking lights, if desired, by merely supplying additional electric bulbs of a smaller candle power.

A still further object of this invention is to provide a set of auxiliary lights of the above-mentioned character adapted for illuminating the motor for inspection or repairs.

A still further object of this invention is to provide a set of auxiliary lights for an automobile which will not reflect rays of light on the cowl thereof and disturb the driver.

Other objects and advantages of this invention will become apparent during the course of the following description.

In automobiles having side lights as standard equipment the additional mounting of driving lights is often undesirable because the side lights interfere with the beam of the driving lights, reflecting it back into the driver's eyes. The increasing of the number of lights on an automobile instead of decreasing the number is undesirable and lights supported on the cowl posts or windshield result in blind spots.

Furthermore, when the car door opens, forward as many do, the occupants' clothing frequently catches on the lights in entering and leaving the car, and if the door opens the opposite way it frequently collides with the lights, thereby causing damage to both light and body finish.

In the drawing forming a part of this specification and in which like numerals are employed to designate like parts throughout the same. Figure 1 is a perspective view of an automobile showing an embodiment of the invention applied thereto;

Figure 2 is a horizontal fragmentary view through the cowl and instrument board, showing only the parts pertinent to my invention;

Figure 3 is a fragmentary cross sectional view taken on lines $3^x$—$3^x$ of Figure 2, showing the side lamp and a part of the controlling mechanism; and Figure 4 is a cross sectional view taken on lines $4^x$—$4^x$ of Figure 3, showing the manner in which the lamp is placed for universal movement.

In the drawing, wherein for the purpose of illustration is shown a preferred embodiment of the invention, the numeral 5 designates an automobile, having the usual radiator 6, hood 7 and cowl 8, all of which are parts of the conventional form of automobile used at present and are shown as an example of the location of the invention which will be fully described in the following paragraphs.

Positioned at the joint between the hood 7 and cowl 8 are a pair of light housings 9, secured to the cowl 8, by hollow brackets or supports 10, which may be formed as an integral part of the light housings 9, or may be secured thereto by welding or the like.

Within the light housings 9, and mounted for universal movement are light shells 11, having a reflector 12, through which projects the lamp socket 13, for supporting a small electric bulb 14. A lens 15 of the usual thickness is positioned in each of the light shells 11 and is held in place by the broken ring 16, particularly formed for this purpose. The light shells 11, are supported within the light housings 9 by brackets or supports 17, being secured to the light housings 9 by welding. The light housings 9 are formed in two sections in order to provide removable sections 18, as shown in Figure 4 to permit the removal of the light shell 11 for the purpose of gaining access thereto or the easy removal of the same.

Auxiliary lamp bulbs 20 as shown in Figure 4 may also be placed in the reflectors 2 in the same circuit with the lamp bulbs 14 or it may be in an entirely different set of circuits 21, from the circuits 22 through the lamp sockets 13.

Openings 24 are formed in the side of the light shells 11, which communicate with openings 25 in the lamp housings 9, for receiving links 26, connected to the lamp shells 11 as at 27.

A cross bar 30 is adapted to pass through openings 31 in the cowl 8 which also alines with the openings 24, and 25, in the light shells 11 and light housings 9 respectively. The cross bar is adapted to have its ends connected to the links 26 as at 33, for operatively connecting the same together.

An operating lever 35 is provided with a spherical portion 36, which is movably secured in the ball socket 37, and held in place upon the instrument board 38, by a screw threaded thimble 39, screw threaded in the ball socsket 37, thereby forming a universal joint. An extension lever 40 is secured to the spherical portion 36, and has its end connected to a slidable link including telescoping sections 41 and 42. The extension 40 is formed with a forked portion 43 connected to a similar forked portion 44 formed on the slidable link 42 and the extension 40.

The slidable section 41 is connected to a central point of the cross bar 30 by a pin 45 for pivotal movement. A brace 46 may have one of its ends pivotally supported on the dashboard 47, as at 48, and its opposite end pivotally secured to the slidable link section 41.

The opposite ends of the cross bar 30 are slidably mounted in bushings 50, carried by the brackets 51, of the supports 10.

It will be readily seen that movement imparted to the handle 35 will cause the cross bar 30 to move in a corresponding direction, thereby moving the side lights 11 in the position desired by the operator.

Having thus described my invention, I claim:

1. An automobile light comprising a hollow shell fixedly secured direct to the automobile body, a lamp adjustably mounted therein, and manually operable means extending through the body wall into the shell for moving the lamp within its shell into adjusted position.

2. Apparatus as in the last preceding claim, in which the lamp has a substantially major-part spherical casing, and which is adjustable therewith in the shell for universal turning movement.

3. The combination with an automobile body of a shell fixedly positioned thereon and having its interior in communication with the interior of the body, a lamp and supporting means adjustably mounted inside the shell, and means housed within the automobile body and conveniently located within the grasp of the driver for moving the lamp within its shell into adjusted positions.

4. Apparatus in accordance with the last preceding claim, in which there are two such shells and lamps located on opposite sides of the cowl, and both worked from the same operating means.

In testimony whereof, I affix my signature.

HENRY H. HARRIS.